(12) United States Patent
Fullam

(10) Patent No.: US 8,145,247 B2
(45) Date of Patent: Mar. 27, 2012

(54) CLOCK SYNCHRONIZATION FOR A WIRELESS COMMUNICATIONS SYSTEM

(75) Inventor: Scott Fullam, Palo Alto, CA (US)

(73) Assignee: 2Wire, Inc., San Jose, CA (US)

( * ) Notice: Subject to any disclaimer, the term of this patent is extended or adjusted under 35 U.S.C. 154(b) by 0 days.

(21) Appl. No.: 13/037,066

(22) Filed: Feb. 28, 2011

(65) Prior Publication Data

US 2011/0158364 A1 Jun. 30, 2011

Related U.S. Application Data

(63) Continuation of application No. 11/804,156, filed on May 15, 2007, now Pat. No. 7,920,881.

(51) Int. Cl.
*H04B 7/00* (2006.01)

(52) U.S. Cl. ........ 455/502; 455/561; 370/324; 370/350; 370/503; 713/375; 713/400; 713/401; 713/600; 709/248

(58) Field of Classification Search .................. 455/502, 455/561; 370/324, 350, 395.62, 503; 713/375, 713/400, 401, 600; 709/248
See application file for complete search history.

(56) References Cited

U.S. PATENT DOCUMENTS

| | | | |
|---|---|---|---|
| 6,433,739 B1 * | 8/2002 | Soliman | 342/387 |
| 6,847,826 B1 | 1/2005 | Wesby et al. | |
| 7,505,428 B2 * | 3/2009 | Kimura | 370/328 |
| 2003/0084190 A1 * | 5/2003 | Kimball | 709/248 |
| 2006/0064725 A1 | 3/2006 | Rabinowitz | |
| 2007/0053340 A1 | 3/2007 | Guilford | |

OTHER PUBLICATIONS

Matthew Rabinowitz et al., "A New Positioning System Using Television Synchronization Signals," Rosum Corporation. May 15, 2007 http://www.rosum.com/rosum_whitepapers.html.
International Search Report and Written Opinion of the International Searching Authority, PCT/US08/06196 filed May 14, 2008, mailed Jul. 23, 2008.
International Preliminary Report on Patentability, PCT/US08/006196 filed May 14, 2008, issued Nov. 17, 2009.

\* cited by examiner

*Primary Examiner* — Fayyaz Alam
(74) *Attorney, Agent, or Firm* — Head, Johnson & Kachigian, P.C.

(57) ABSTRACT

Clock synchronization for a wireless communication system is described. The communication system utilizes a server with a radio coupled to receive a radio frequency (RF) signal and a clock interface to receive a reference clock signal. The server includes a network interface configured to receive, from a base station, a time that the RF signal was received at the base station. The server further includes a processing device configured to determine when the RF signal was transmitted and a location of the base station, and configured to calculate clock offset value representative of a time to delay a local clock signal at the base station to synchronize the local clock signal at the base station with the reference clock signal.

14 Claims, 7 Drawing Sheets

CLOCK SYNCHRONIZATION FOR A WIRELESS COMMUNICATIONS SYSTEM

REFERENCE TO RELATED APPLICATION

This application is a continuation of application Ser. No. 11/804,156, filed May 15, 2007, which is hereby incorporated by reference.

TECHNICAL FIELD

This disclosure relates generally to wireless communications and in particular but not exclusively, relates to synchronizing clocks in a wireless communications system.

BACKGROUND

A high percentage of wireless communications is conducted with a mobile device located inside a building, while the wireless communications networks are conventionally implemented such that the cellular antennas are located outside of buildings. Inherent with in-building penetration of cellular signals is an attenuation of the cellular signal strength. Thus, the attenuation of signal strength may result in a lack of, or reduced, communications coverage while the mobile device is located inside of a building. For example, the user of a mobile device may be unable to place or receive a telephone call while inside a house or office building.

One device used to compensate for weak cellular signals within a building is known as a home base station, also known as a femtocell. Home base stations are typically stand alone units deployed within a building, such as an office, a place of business, or even a home. These home base stations provide two-way wireless voice and data communications coverage for a mobile device, thereby extending the effective coverage area for the communications network. The home base station supports cellular calls locally, and then uses a broadband connection to carry traffic to the communications network. One advantage of a home base station is that they typically operate with existing mobile devices rather than requiring users to use a separate phone or even upgrade to an expensive dual-mode device.

Successful operation of a handoff of a mobile device between base stations depends on the stability and synchronization of the internal clocks of respective base stations. In particular, in order for respective base station and mobile device transmissions to stay locked to each other, the internal clock of the current base station must be synchronized with the internal clock of the base station to which the mobile device is being handed off. In addition, synchronization of one base station with a communications network reduces the likelihood that communications between the base station and a mobile device will interfere with other communications on the same network.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
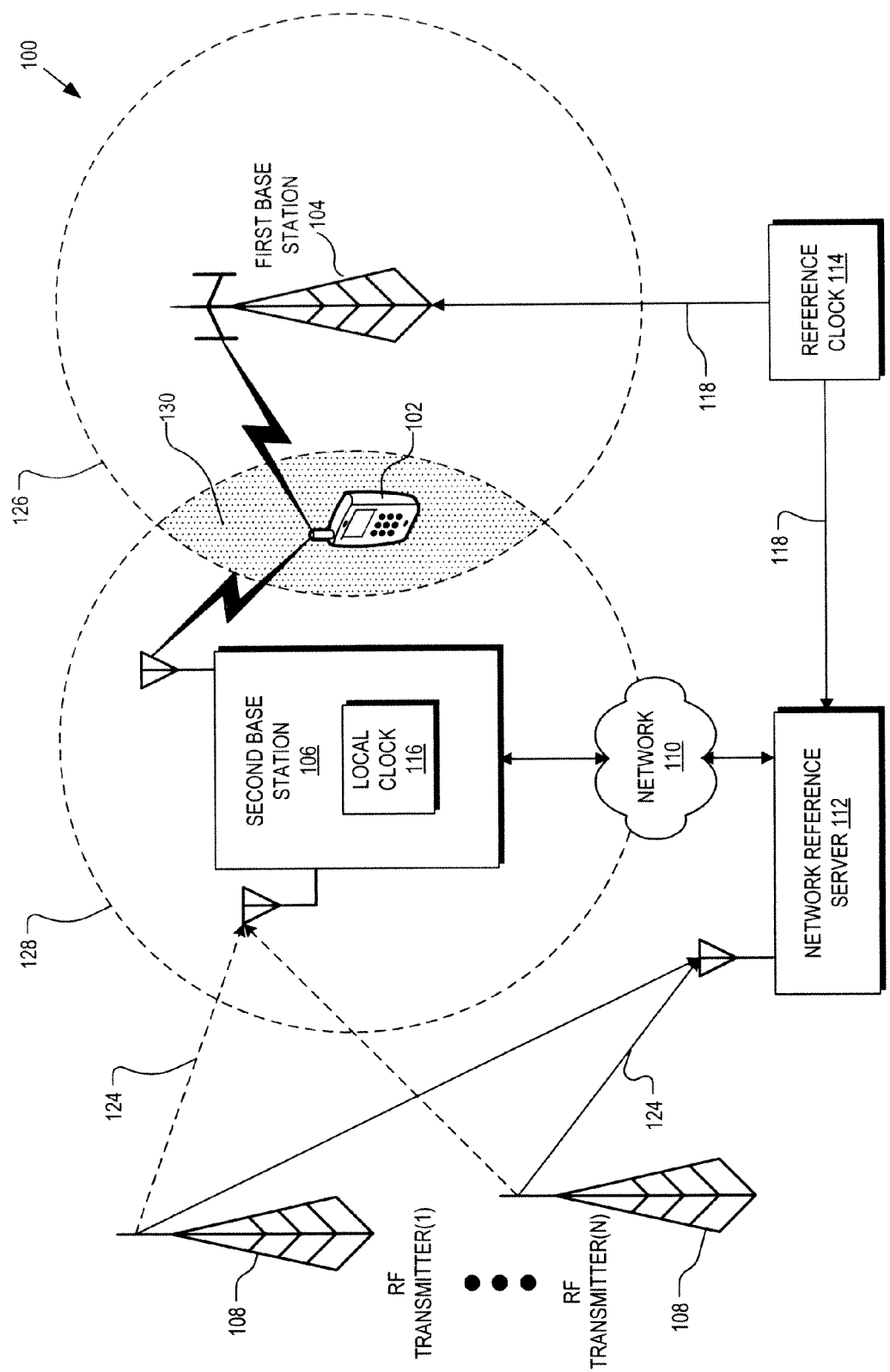
FIG. 1 is a functional block diagram illustrating a wireless communications system, in accordance with an embodiment of the invention.

Embodiments of apparatuses and methods for clock synchronization for a wireless communications system are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In a wireless communication network, one or more base stations are selectively positioned within respective geographic coverage areas or cells. These base stations are used to transmit and receive communication signals to and from mobile devices (e.g., mobile or cellular telephone handsets) located within a respective cell. In particular, the base stations act as intermediary points by which a communication path may be periodically established and maintained between mobile devices, as well as between a mobile device and an end point of a stationary network, such as, a landline connected to a public switched telephone network ("PSTN").

There are a variety of a communication protocols in which mobile devices can communicate (e.g., place and receive telephone calls) with a base station of the communication network. For example, Code Division Multiple Access (CDMA), Time Division Multiple Access (TDMA), and Universal Mobile Telecommunications System (UMTS) are all well known communication protocols. Of concern with the selection of a communication protocol is the ability of the mobile device to communicate with the base stations in a simple, flexible and rapid manner so that the mobile device is not required to wait to establish a communication path and that a hand off of an active call between base stations in a mobile network is transparent to a respective mobile device. In this respect, the ability to acquire and maintain synchronization between base stations is an important consideration. That is, network-wide synchronization should be established and maintained for optimal operation of a wireless communications network to minimize interference problems otherwise caused by non-synchronized base stations in adjacent cell locations.

For example, a TDMA protocol for a wireless communication network includes each base station transmitting over a set of time-division air channels, or time slots. By transmitting during sequential time slots, a base station may communicate with a mobile device over an unoccupied time slot to establish a communications link. Each base station may thereby maintain communication with as many mobile devices as there are available time slots.

In accordance with this protocol, handoffs between base stations may be initiated by the respective mobile device, which monitors available time slots from the same and competing base stations during unused time slots. A mobile device may then handoff to establish communication in a new time slot of the same base station, or may handoff in such a manner as to establish communication within a different base station.

Accordingly, embodiments of the invention are disclosed which provide synchronization of a base station in a wireless communications system. In one embodiment, the base station to be synchronized is a home base station located in an office, home, or other wireless hotspot where the base station is connected to a computer network via a broadband connection that includes network delays that are neither consistent nor predictable (e.g., cable and DSL).

Embodiments of the invention utilize radio frequency (RF) signals transmitted from known locations, such as from broadcast television towers or broadcast radio towers, to aide in the synchronization of the base station's local clock. For example, in one embodiment, RF signals are received at the base station and at a network reference server. The network reference server is also coupled to receive a reference clock signal to which various base stations of the communications network are to be synchronized. A clock offset value is calculated, either at the base station or at the network reference server, in response to the timing of the RF signal received at the base station, the timing of the RF signal received at the network reference server, and in response to the reference clock, itself. In one embodiment, the clock offset value represents an amount of time to delay the local clock at the base station such that it is synchronized with the reference clock of the communications network. The base station then synchronizes its local clock based on the calculated clock offset value.

FIG. 1 is a functional block diagram illustrating a wireless communications system 100, in accordance with an embodiment of the invention. The illustrated embodiment of wireless communications system 100 includes a mobile device 102, a first base station 104, a second base station 106, radio frequency (RF) transmitters 108, a computer network 110, a network reference server 112, and a reference clock 114.

In the illustrated embodiment, wireless communications system 100 provides wireless communications coverage for mobile devices, such as mobile device 102. In one embodiment, mobile device 102 is a portable transceiver, such as a mobile or cellular phone. In another embodiment, mobile device 102 is a portable transceiver, such as a smart phone, a personal digital assistant (PDA), a wireless pc card, a laptop computer, or the like.

First base station 104 and second base station 106 each provide wireless communications coverage for mobile devices that are within a coverage area of the respective base station. For example, when mobile device 102 is within a coverage area 126, first base station 104 may provide wireless communications coverage for the mobile device. Similarly, when mobile device 102 is within a coverage area 128, second base station 106 may provide wireless communications coverage for the mobile device. In one embodiment, second base station 106 is a home base station where coverage area 128 extends substantially inside of a building, such as an office, place of business, or in a home. In another embodiment, first base station 104 includes a cellular tower located outdoors and is part of a cellular communications network.

To ensure continuity of communications, it may be desirable to have coverage areas overlap, such as is shown by overlapped coverage area 130. When a mobile device moves from one coverage area to another it generally switches communicating with a base station of one coverage area to communicating with a base station of another coverage area. This process is known as handover or handoff. For example, mobile device 102 may initiate communicating (e.g., placing a telephone call) through first base station 104 while mobile device 102 is within coverage area 126. As mobile device 102 moves from coverage area 126 to coverage area 128 a decision is made that mobile device 102 should be handed off from first base station 104 to second base station 106. This handoff procedure generally occurs while mobile device 102 is within overlapped coverage area 130 so that mobile device 102 can seamlessly transition from communicating with first base station 104 to communicating with second base station 106. After the handoff is complete, mobile device 102 may continue its communications, but now through second base station 106.

In one embodiment, base stations 104 and 106 communicate with mobile device 102 via a Code Division Multiple Access (CDMA) standard, such as CDMA2000. In another embodiment, base stations 104 and 106 communicate with mobile device 102 via a Time Division Multiple Access (TDMA) standard, such as Global Systems for Mobile communications (GSM). In still another embodiment, base stations 104 and 106 communicate with mobile device 102 via a Universal Mobile Telecommunications System (UMTS) standard or a Worldwide Interoperability for Microwave Access (WiMAX) standard.

In the illustrated embodiment, reference clock 114 is coupled to provide first base station 104 with a reference clock signal 118. In one embodiment, reference clock 114 is a master reference clock used by communications system 100 to synchronize various base stations. First base station 104 may be coupled to reference clock 114 via an ISDN (e.g., T1), a point to point microwave, or a fiber Optic (e.g., OC3) connection to receive reference clock signal 118. However, such connections may not be feasible for each base station in communications system 100, due to cost limitations, or logistical constraints. For example, the illustrated embodiment of second base station 106 does not include a direct connection to reference clock 114. Instead, a local clock 116 at second base station 106 is synchronized with reference clock signal 118 in response to one or more radio frequency (RF) signals 124 transmitted by one or more RF transmitters 108.

In one embodiment, RF signals 124 include a synchronization signal such as a periodic or cyclical timestamp. The timestamp provides a unique reference upon which second base station 106 and NRS 112 may base their calculations. In one example, RF signals 124 include broadcast television signals (also known as over-the-air and terrestrial television signals). Since, the location of RF transmitters 108 that broadcast television signals can be readily established, the synchronization signals of broadcast television can be utilized with known methods to determine a very accurate location of a device. The synchronization signal of broadcast television may include periodic or cyclical timestamp information such as the presentation time stamp (PTS) or decode time stamp (DTS) of several known television standards.

For example, RF signals 124 may include a National Television Standards Committee (NTSC) signal. In another example, RF signals 124 may include an American Television Standards Committee Digital Video Television (ASTC DTV) signal. In still another example, RF signals 124 may include a Digital Video Broadcasting (DVB) signal. In yet another example, RF signals may include an Integrated Services Digital Broadcasting (ISDB) signal. In addition to, or as an alternative to broadcast television signals, RF signals 124 may include broadcast radio signals, such as a Frequency Modulated (FM) radio signal, an Amplitude Modulated (AM) radio signal, or a Digital Audio Broadcast (DAB) signal.

As is shown in FIG. 1, network reference server (NRS) 112 is communicatively coupled to second base station 106 via computer network 110. Computer network 110 may be the public internet or alternatively may be a private network. In one embodiment, second base station 106 is coupled to computer network 110 via an IP broadband connection which includes network delays that are neither consistent nor guaranteed, such as a Digital Subscriber Line or a cable modem connection. NRS 112 is also coupled to receive reference clock signal 118 from reference clock 114 via a communications link, such as an ISDN (e.g., T1), a point to point microwave, or a fiber Optic (e.g., OC3) connection.

In operation, both second base station 106 and NRS 112 receive one or more of RF signals 124. The RF signals received at second base station 106 may then be used to calculate a physical location of the second base station 106. In one embodiment, second base station 106 includes a processing device to calculate its location locally at second base station 106. In another embodiment, second base station 106 transmits information about the timing of the received RF signals to NRS 112 via network 110. In this embodiment, NRS then calculates the location of second base station 106 and transmits the location back to second base station 106 over network 110. Additionally, the physical location of NRS 112 may be determined based on the timing of the RF signals 124 received at NRS 112.

Once the respective locations of second base station 106 and NRS 112 are determined, one or more of RF signals 124 are selected which is then used to calculate a clock offset value to synchronize local clock 116 with reference clock 114. Further description of synchronizing local clock 116 and calculating the clock offset value is provided in more detail below.

Figure 2:
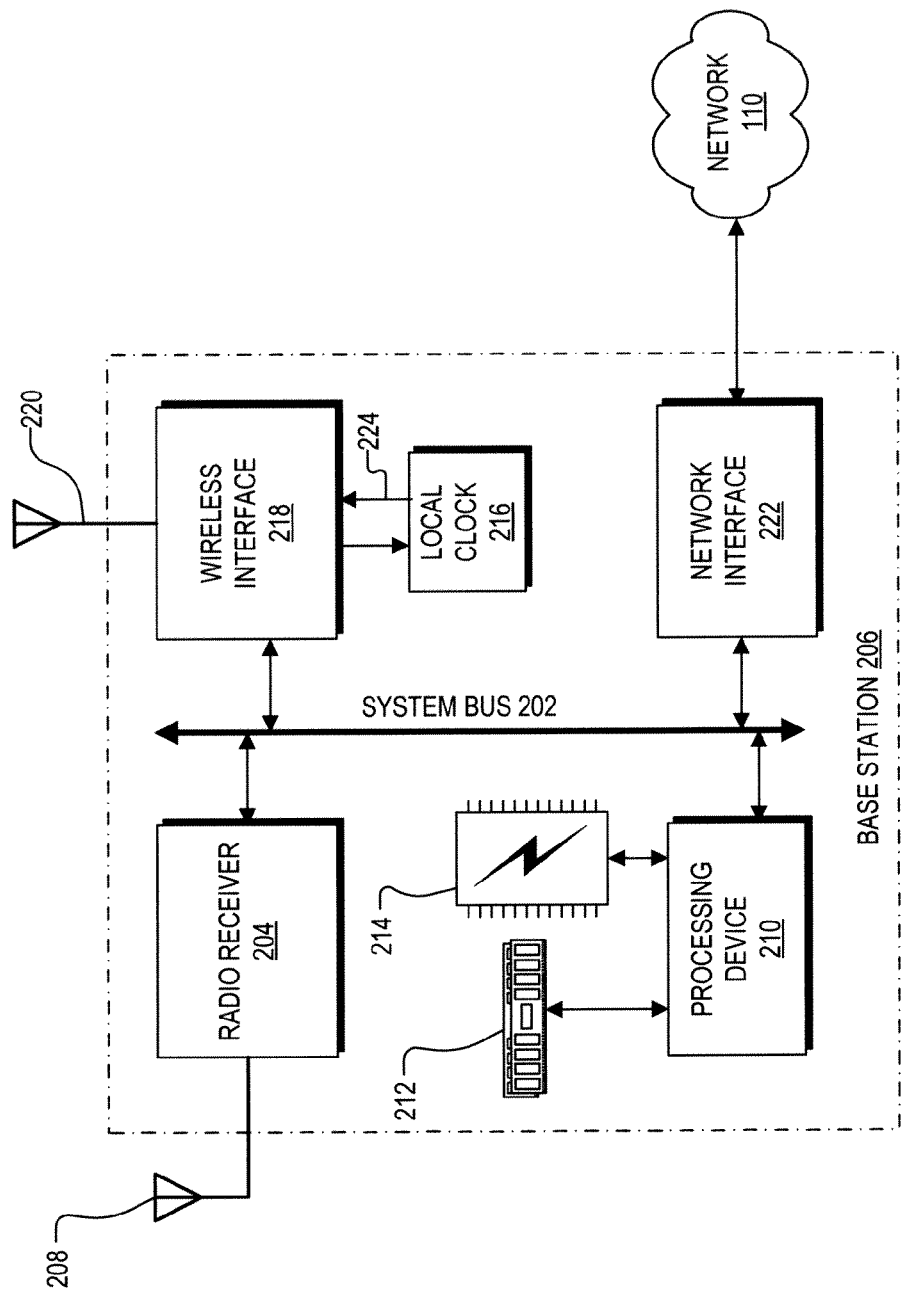
FIG. 2 is a functional block diagram illustrating a base station, in accordance with an embodiment of the invention.

FIG. 2 is a functional block diagram illustrating a base station 206, in accordance with an embodiment of the invention. Base station 206 represents one possible implementation of second base station 106, shown in FIG. 1. The illustrated embodiment of base station 206 includes a system bus 202, a radio receiver 204, a radio antenna 208, a processing device 210, a Random Access Memory (RAM) 212, a non-volatile storage (NVS) 214, a local clock 216, a wireless interface 218, a wireless antenna 220, and a network interface 222.

In the illustrated embodiment, wireless interface 218 is configured to send and receive wireless communications to and from a mobile device (e.g., mobile device 102 of FIG. 1) via wireless antenna 220. In one embodiment, wireless interface 218 is configured to communicate with a mobile device in accordance with a CDMA standard, such as CDMA2000. Alternatively, wireless interface 218 may be configured to communicate with a mobile device in accordance with a TDMA standard, a GSM standard, a UMTS standard, or a WiMAX standard.

Local clock 216 is coupled to provide wireless interface 218 with a local clock signal 224. Wireless interface 218 uses local clock signal 224 as the basis for timing its wireless communications with a mobile device. For example, if wireless interface 218 is configured to communicate in accordance with a TDMA standard, wireless interface 218 may communicate with multiple mobile devices, each during a respective time slot, where the timing of each time slot is determined in response to local clock signal 224.

Radio receiver 204 is configured to receive RF signals 124 via radio antenna 208. Radio receiver 204 may be configured to receive RF signals including, but not limited to, broadcast television signals (e.g., NTSC, ASTC DVT, DVB, and ISDB) or broadcast radio signals (e.g., FM, AM, and DAB). In one embodiment, radio receiver 204 is configured to receive a combination of the aforementioned RF signals. For example, radio receiver 204 may receive one or more NTSC television signals and one or more ASTC DVT television signals. In another example, radio receiver 204 may receive one or more broadcast television signals and one or more broadcast radio signals.

Upon receiving RF signals, radio receiver 204 determines timing information pertaining to when each RF signal was received at base station 206. Radio receiver 204 then transmits this timing information to processing device 210 and/or to network interface 222 via system bus 202. In one embodiment, RAM 212 or NVS 214 includes the location of the RF transmitters that transmitted the received RF signals. Using the known locations of the RF transmitters, processing device 210 calculates the location of base station 206 in response to the timing information received from radio receiver 204. In another embodiment, the location of base station 206 is calculated by a device separate from base station 206, such as NRS 112 of FIG. 1. In this embodiment, network interface 222 transmits the timing information to a network reference server (e.g., NRS 112 of FIG. 1) via network 110. In response, network interface 222 receives the location of base station 206 from the network reference server. Network interface 222 may then transmit the location information to processing device 210 via system bus 202 for further processing.

As mentioned above, synchronization among base stations in a communications network is desirable to maintain uninterrupted calls as a mobile device is handed off from one base station to another. However, in one embodiment, base station 206 may not include a direct connection (e.g., microwave, ISDN, or fiber optic) to a master reference clock such as reference clock 114, shown in FIG. 1. Instead, base station 206 includes radio receiver 204, processing device 210, and network interface 222 to aide in the synchronization of local clock 216 with a master reference clock of the communications network. For example, radio receiver 204 may receive one or more RF signals and then transmit timing information about when those RF signals were received to network interface 222 via system bus 202. Network interface 222 then transmits this timing information to a network reference server (e.g., NRS 112 of FIG. 1). The network reference server then calculates a clock offset value and transmits it back to base station 206. Network interface 222 receives the calculated clock offset value via network 110 and transmits the clock offset value to wireless interface 218 via system bus 202. Wireless interface 218 then adjusts local clock 216 in response to the clock offset value such that local clock 216 is substantially synchronized with the master reference clock of the communications network.

In one embodiment, network interface 222 includes a discrete multi-tone (DMT) communication device, such as a Digital Subscriber Line (DSL) modem. The DMT device may be connected to network 110 via an Asymmetric DSL (ADSL) line, a Very high bit-rate DSL (VDSL) line, a Symmetric DSL (SDSL) line, a Rate-adaptive DSL (RADSL) line, or the like. The DMT system transmits and receives an information bit stream from network 110. The information bit stream is typically converted into a sequence of data symbols having a number of tones. Each tone may be a group of one or more frequencies defined by a center frequency and a set bandwidth. The tones are also commonly referred to as sub-carriers or sub-channels. Each tone acts as a separate communication channel to carry information between base station 206 and a remote transceiver device (e.g., in network reference server 312). In one embodiment, the DMT communication device is a DSL modem that may be connected to computer network 110 via a telephone line of the public switched telephone network (PSTN). In one embodiment, the DMT system divides the available bandwidth of the telephone line into a plurality of approximately 4 kHz wide channels. The DMT system then monitors communications on each channel and shifts data signals from poor quality channels to better quality channels. In another embodiment, network interface 222 includes a cable modem or a dial-up modem. In yet another embodiment, network interface 222 includes a Wi-Fi device for communicating over network 110 via a wireless local area network (not shown).

In one embodiment, wireless interface 218 synchronizes local clock signal 224 with a master reference clock (e.g., reference clock 114 of FIG. 1) by delaying local clock signal 224 for an amount of time indicated by the clock offset value. In another embodiment, wireless interface 218 synchronizes local clock signal 224 with a master reference clock by reducing a phase difference between local clock signal 224 and the master reference clock.

In one embodiment, processing device 210 includes a microprocessor, a microcontroller, or the like. Processing device 210 is coupled to NVS 214, which may be used to store firmware (e.g., control algorithms executable by processing device 210 to implement any of the processes described herein).

Figure 3:
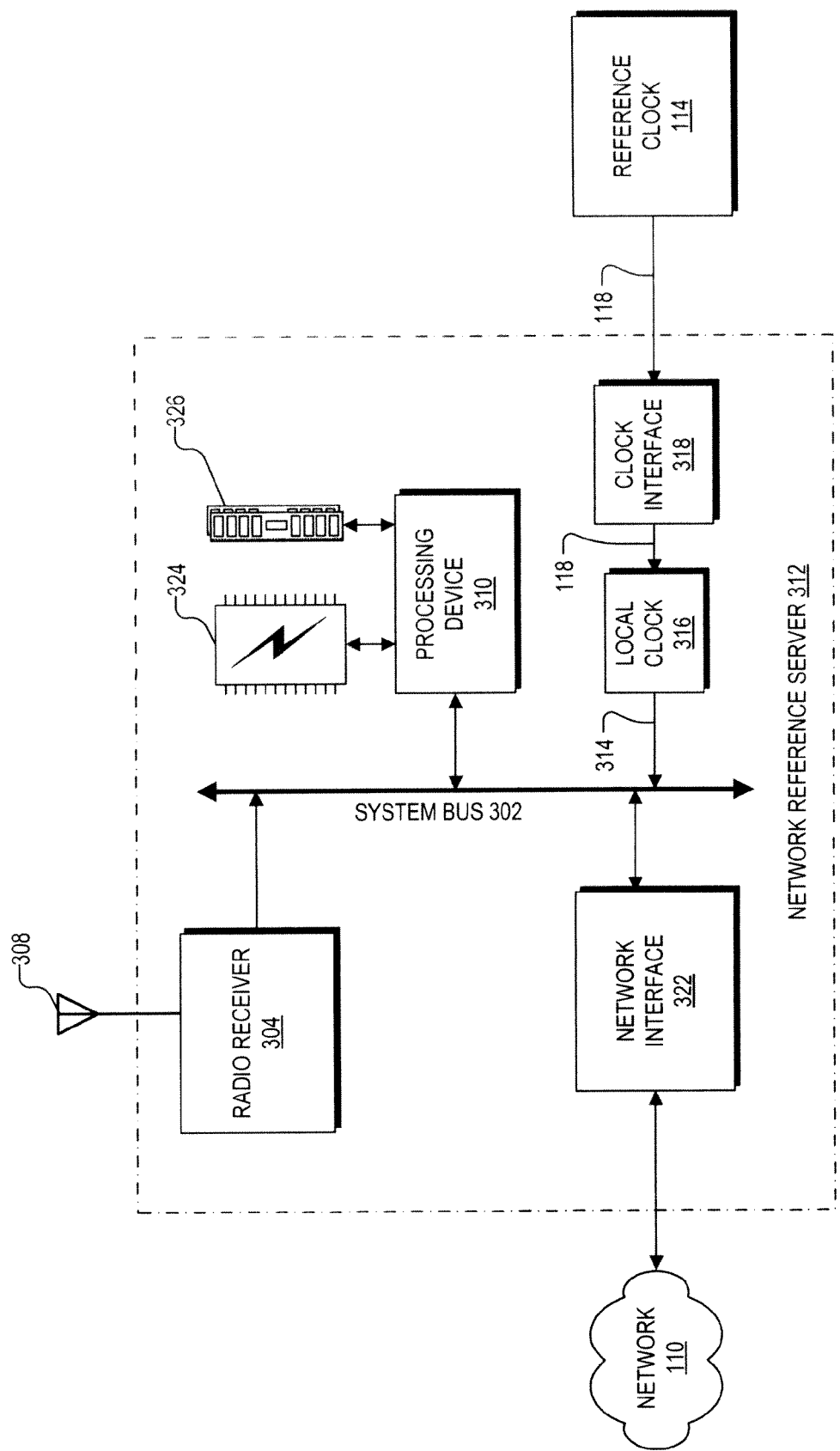
FIG. 3 is a functional block diagram illustrating a network reference server, in accordance with an embodiment of the invention.

FIG. 3 is a functional block diagram illustrating a network reference server (NRS) 312, in accordance with an embodiment of the invention. NRS 312 represents one possible implementation of NRS 112 of FIG. 1. The illustrated embodiment of NRS 312 includes a system bus 302, a radio receiver 304, a radio antenna 308, a processing device 310, a local clock 316, a clock interface 318, a network interface 322, a Random Access Memory (RAM) 324, and a non-volatile storage (NVS) 326.

Clock interface 318 is coupled to receive reference clock signal 118 from reference clock 114. In one embodiment, reference clock signal 118 is a master reference clock signal of a communications system to which various base stations are synchronized. In one embodiment, clock interface 318 receives reference clock signal 118 via an interface without substantial delay or via an interface where the delay is reliably predictable. For example, clock interface 318 may include an ISDN (e.g., T1) modem, a point to point microwave interface, or a fiber Optic (e.g., OC3) connection.

Local clock 316 is coupled to clock interface 318. In one embodiment, clock interface 318 is configured to periodically synchronize local clock 316 with reference clock signal 118. Local clock 316 is also coupled to output a local clock signal 314 to processing device 310 via system bus 302. Although FIG. 3 shows NRS 312 as including local clock 316, it is recognized that local clock 316 may be omitted and clock interface 318 coupled directly to system bus 302.

Radio receiver 304 is configured to receive RF signals via radio antenna 308. Radio receiver 304 may be configured to receive RF signals including, but not limited to, broadcast television signals (e.g., NTSC, ASTC DVT, DVB, and ISDB) or broadcast radio signals (e.g., FM, AM, and DAB). In one embodiment, radio receiver 304 is configured to receive a combination of the aforementioned RF signals. For example, radio receiver 304 may receive one or more NTSC television signals and one or more ASTC DVT television signals. In another example, radio receiver 304 may receive one or more broadcast television signals and one or more broadcast radio signals.

Upon receiving RF signals, radio receiver 304 determines timing information pertaining to when each RF signal was received at NRS 312. Radio receiver 304 then transmits this timing information to processing device 310. In one embodiment, RAM 326 or NVS 324 includes the locations of a plurality of RF transmitters (e.g., RF transmitters 108 of FIG. 1). In another embodiment, the locations of the RF transmitters are stored in a database (not shown) located locally in base station 206 or elsewhere in network 110. Using the known locations of the RF transmitters, processing device 310 calculates the location of NRS 312 in response to the timing information received from radio receiver 304.

In one embodiment, the location of a base station, such as base stations 106 and 206, are determined by NRS 312. In this embodiment, network interface 322 receives timing information pertaining to when the RF signals were received by a base station. In response, network interface 322 transmits this timing information to processing device 310 via system bus 302. Using the known locations of the RF transmitters, processing device 310 calculates the location of the base station in response to the timing information received from the base station. The location of the base station may then be transmitted back to the base station via network interface 322 and network 110.

In one embodiment, NRS 312 serves as a locator of a plurality of base stations. For example, several base stations geographically spaced apart may transmit RF timing information to the NRS 312 via network 110. NRS 312 may then determine the location of each base station and transmit the location of each back to a respective base station.

NRS 312 may also serve as a central access point for synchronization information for several base stations. For example, in one embodiment, a plurality of base stations that do not have direct access (e.g., microwave, ISDN, or fiber optic) to a master reference clock of a communications system may transmit timing information pertaining to when RF signals were received at the base stations. In response, NRS 312 may calculate a time delay or clock offset value for each base station and transmit it back to each respective base station so that each may synchronize its local clock with the reference clock 114.

In one embodiment, processing device 310 includes a microprocessor, a microcontroller, or the like. Processing device 310 is coupled to NVS 314, which may be used to store firmware (e.g., control algorithms executable by processing device 310 to implement any of the processes described herein).

Figure 4:
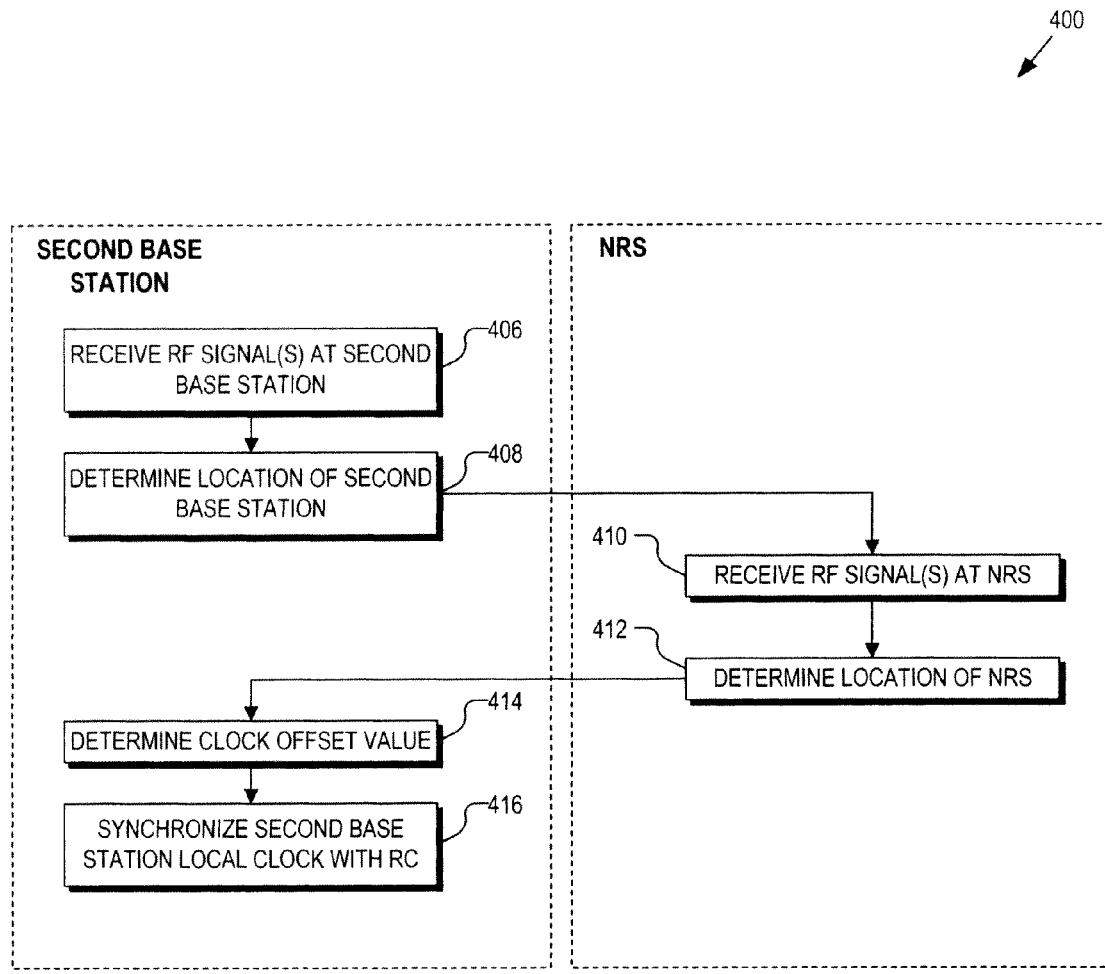
FIG. 4 is a flow chart illustrating a process for synchronizing a base station to a wireless communications system, in accordance with an embodiment of the invention.

FIG. 4 is a flow chart illustrating a process 400 for synchronizing a base station to a wireless communications system, in accordance with an embodiment of the invention. Process 400 is described with reference to FIGS. 1-4. The order in which some or all of the process blocks appear in process 400 should not be deemed limiting. Rather, one of ordinary skill in the art having the benefit of the present disclosure will understand that some of the process blocks may be executed in a variety of orders not illustrated.

In one embodiment, mobile device 102 communicates with first base station 104. Mobile device 102 may either have initiated a communications link with first base station 104 (e.g., placed a call) or first base station 104 may have initiated a communications link with mobile device (e.g., receiving a call). Alternatively, mobile device 102 may have been handed off from another base station as mobile device 102 traveled into coverage area 126. As mobile device 102 travels into overlapped coverage area 130 a decision is made whether to hand off mobile device from first base station 104 to second base station 106. In one embodiment, the decision whether to hand off may be made, in part, based on relative signal strengths of the respective coverage areas 126 and 128. For example, second base station 106 may provide a coverage area 128 that extends primarily inside of a building, while first base station 104 provides a coverage area 126 that extends primarily outdoors. In this example, as mobile device 102 travels from outdoors to inside of the building the wireless signal strength provided by first base station 104 may be greatly reduced, while wireless signal strength provided by second base station 106 is stronger. In order to improve call quality and reliability a mobile device 102 should be handed off from first base station 104 to second base station 106.

In one embodiment, the decision to hand off may be made based on an economic incentive. For example, as described above second base station 106 may be a home base station for extending cellular coverage of communications network 100 to inside of a building. In this example, voice and data information may be packetized and transmitted to the communications network via computer network 110. As may be the case, transmitting voice and data over computer network 110 rather than using bandwidth of first base station 104 may be cheaper for a subscriber of cellular services. In this regards, it may always be decided to handoff to second base station 106 if mobile device 102 is within coverage area 128.

As mentioned above, synchronization among base stations in a communications network is desirable to maintain uninterrupted calls as a mobile device is handed off from one base station to another. Furthermore, synchronization among base stations may be desirable to reduce interference among adjacent or near base stations. Process 400 provides one possible implementation of synchronizing a base station, where in a process block 406, the process of synchronizing local clock 116 to reference clock 114 begins. Process 400 of synchronization may occur periodically as suited for a particular purpose of communications system 100.

FIG. 4 includes boxes labeled "Second Base Station" and "NRS". Process blocks 406 through 416 are shown as included in one of these two blocks to indicate a respective device of communications system 100 that performs those functions in the illustrated embodiment. For example, process block 406 indicates that RF signals 124 are received at second base station 106. Process block 406 is shown as included in the box labeled "Second base Station". Thus, in this embodiment, second base station 106 is responsible for performing process block 406. However, it is appreciated that various process blocks described herein may be performed at either second base station 106 or at network reference server (NRS) 112, depending on the particular implementation of communications system 100. For example, after RF signals 124 are received at second base station 106, process 400 continues to a process block 408, where the location of second base station 106 is determined. As discussed above, the location of second base station 106 may be determined by either second base station 106 or by NRS 112. If the location of second base station 106 is determined by second base station 106, itself, the known locations of RF transmitters 108 and the time that RF signals were received by second base station 106 are used to calculate the location of base station 106. In one embodiment, the location of second base station 106 is calculated to within approximately one foot. If the location of second base station 106 is determined by NRS 112, the time that RF signals were received by second base station 106 is transmitted to NRS 112 via network 110, where a similar calculation is made by NRS 112. NRS 112 may then transmit location information back to second base station 106 via network 110.

In one embodiment, determining the location of second base station 106 includes calculating a distance from at least one of the RF transmitters 108 to second base station 106. In another embodiment, the elevation of second base station 106 and at least one of the RF transmitters 108 is determined to more accurately determine a distance between the two. For example, after the location of second base station 106 is determined, the location may be cross-referenced with a topological map to determine an elevation of second base station 106.

In process blocks 410 and 412, NRS 112 receives RF signals 124 and determines a location of NRS 112 in a similar manner as is used to determine the location of second base station 106, described above. For purposes of determining the location of NRS 112, it is recognized that the set of RF signals 124 that were used to determine the location of second base station 106 need not be the same set of RF signals used to determine the location of NRS 112. Also, in one embodiment, determining the location of NRS 112 may include calculating a distance from at least one of the RF transmitters 108 to the NRS 112. In another embodiment, the elevation of NRS 112 and at least one of the RF transmitters 108 is determined to more accurately determine a distance between the two.

In a process block 414, a clock offset value is determined. In one embodiment, clock offset value represents an amount of time to delay local clock 116 such that local clock 116 and reference clock 114 are substantially synchronized. In another embodiment, clock offset value represents a phase difference between local clock signal 224 (shown in FIG. 2) and reference clock signal 118 (shown in FIG. 3).

After the clock offset value is calculated, second base station 106 synchronizes local clock 116 with reference clock 114 in a process block 416. In one embodiment, second base station 106 synchronizes local clock 116 by reducing a phase difference between local clock signal 224 and reference clock signal 118 to below a phase difference threshold. The phase difference threshold may be a predetermined value set in the second base station 106 or it may be a dynamic value that changes depending on a desired system performance.

After local clock signal 224 is synchronized with reference clock signal 118, mobile device 102 may be handed off to second base station 106 with a reduced risk of dropping the connection between mobile device 102 and communications network 100. In one embodiment, wireless interface 218 (shown in FIG. 2) negotiates with first base station 104 to complete the hand off of mobile device 102. In one embodiment, mobile device 102 performs a hard hand off, where the communication link between first base station 104 and mobile device 102 is first broken and then a communication link between mobile device 102 and second base station 106 is established. In another embodiment, mobile device 102 performs a soft hand off, where the communication link between first base station 104 and mobile device 102 is maintained until a communication link between mobile device 102 and second base station 106 is established. After the hand off is complete, mobile device 102 communicates with second base station 106, continuing its previously established call.

Figure 5A:
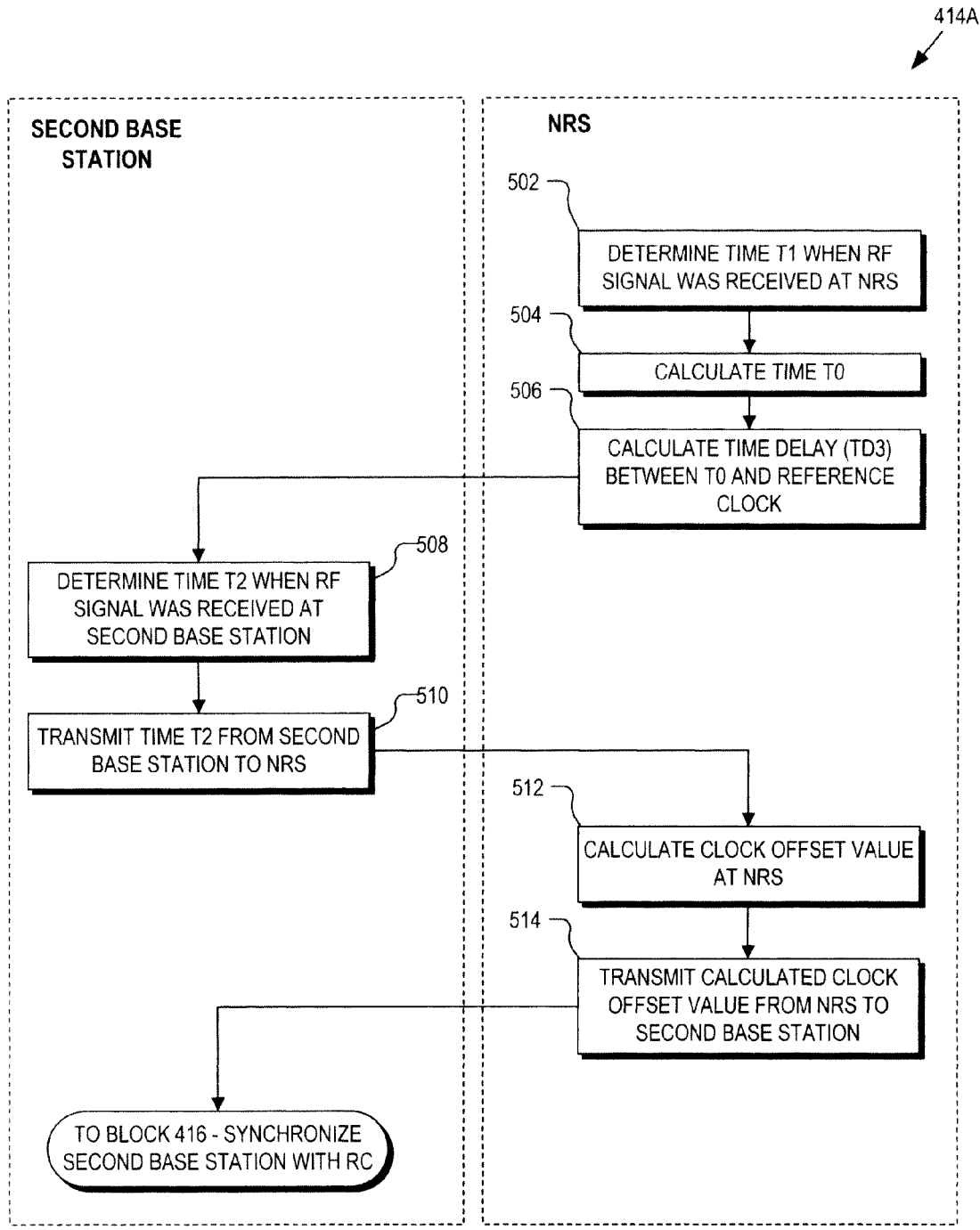
FIG. 5A is a flow chart illustrating a process for determining a clock offset value, in accordance with an embodiment of the invention.
Figure 6:
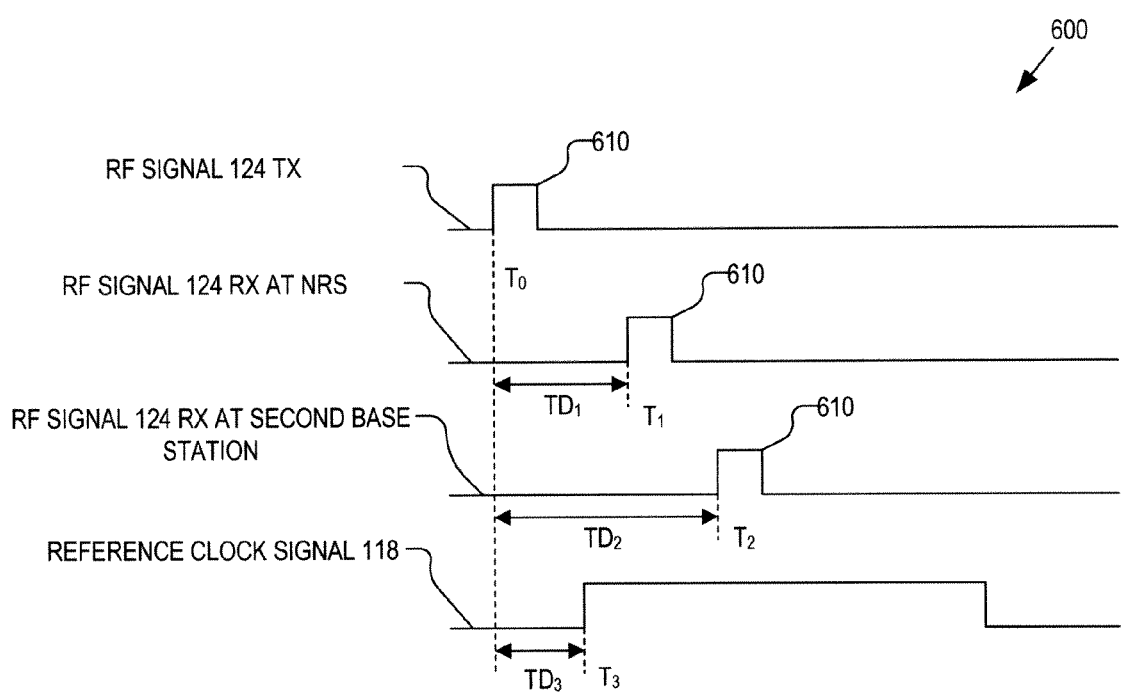
FIG. 6 is a timing diagram illustrating radio frequency signals and a reference clock signal, in accordance with an embodiment of the invention.

FIG. 5A is a flow chart illustrating a process 414A for determining a clock offset value, in accordance with an embodiment of the invention. Process 414A represents one possible implementation of process block 414 of FIG. 4, where clock offset value is calculated at network reference server 112. FIG. 6 is a timing diagram 600 illustrating radio frequency (RF) signal 124 and a reference clock signal 118, in accordance with an embodiment of the invention. Process 414A is described with reference to FIGS. 5A and 6.

As shown in FIG. 6, RF signal 124 is transmitted from an RF transmitter 108 at a time T0. Pulse 610 may represent one or more time stamps included in RF signal 124. For example, pulse 610 may include a presentation time stamp (PTS) or a decode time stamp (DTS) of an ASTC DTV broadcast television signal.

After RF signal 124 is transmitted from RF transmitter 108, it is received at NRS 112 at a time T1. Time T1 is later than time T0 due to a propagation delay of RF signal 124, shown as time delay TD1 in FIG. 6. In a process block 502, NRS 112 determines the time T1 at which RF signal 124 was received at NRS 112. Since the locations of NRS 112 and RF transmitter 108 are known and the speed of light is constant, time T0 can be calculated by subtracting an expected time delay TD1 from time T1 (e.g., process block 504).

Using the calculated time T0, a time delay TD3 can now be calculated in a process block 506. As shown in FIG. 6, time delay TD3 represents an amount of time between time T0 and a rising edge of reference clock signal 118. In another embodiment, time delay TD3 may be measured from time T0 to a falling edge of reference clock signal 118. In yet another embodiment, time delay TD3 may be measured from time T0 to a predetermined fixed point of reference clock signal 118.

The same RF signal 124 is also received at second base station 106 at a time T2 due to another propagation delay, shown as time delay TD2. In a process block 508, time T2 is determined at second base station 106. Although FIG. 6 shows time T2 as later than time T1, it is recognized that time T2 can be sooner, the same, or later than time T1, depending on the relative distance of second base station 106 from RF transmitter 108. In one embodiment, time T0 can also be calculated by subtracting an expected time delay TD2 from time T2 since the location of second base station 106 is also known.

In a process block 510, time T2 is transmitted to NRS 112 via network 110. Now that time T0 is calculated and time delay TD3 is also calculated, a clock offset value can be calculated (e.g., process block 512) so that local clock 116 can be synchronized to reference clock 114. In a process block 514, the calculated clock offset value is transmitted from NRS 112 to second base station 106 via network 110, where process 400 continues to process block 416 to synchronize local clock 116 with reference clock 114 in response to the received clock offset value.

Figure 5B:
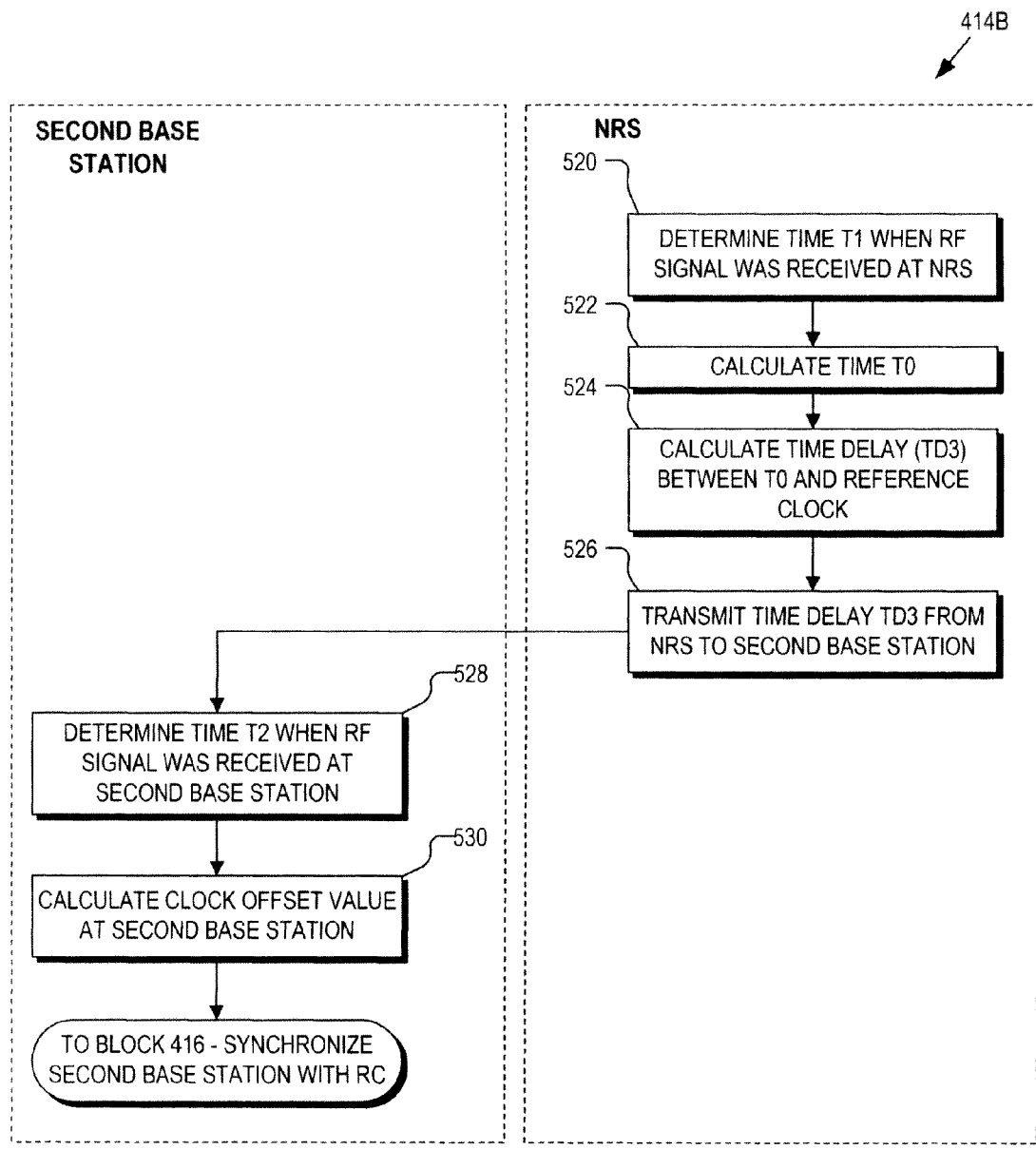
FIG. 5B is a flow chart illustrating another process for determining a clock offset value, in accordance with an embodiment of the invention

FIG. 5B is a flow chart illustrating another process 414B for determining a clock offset value, in accordance with an embodiment of the invention. Process 414B represents another possible implementation of process block 414 of FIG. 4, where clock offset value is calculated at second base station 106. Process 414B is described with reference to FIGS. 5B and 6.

In a process block 520, NRS 112 determines the time T1 at which RF signal 124 was received at NRS 112. Since the locations of NRS 112 and RF transmitter 108 are known and the speed of light is constant, time T0 can be calculated by subtracting an expected time delay TD1 from time T1 (e.g., process block 522).

Using the calculated time T0, a time delay TD3 can now be calculated in a process block 524. In a process block 526, time delay TD3 is transmitted to second base station 106 via network 110.

The same RF signal 124 is also received at second base station 106 at a time T2 due to another propagation delay, shown as time delay TD2. In a process block 528, time T2 is determined at second base station 106. In a process block 530, a clock offset value is calculated based in part on the received time delay TD3. Process 400 then continues to process block 416 to synchronize local clock 116 with reference clock 114 in response to the clock offset value calculated at second base station 106.

Referring again to FIG. 6, a demonstrative example is given. In this example RF transmitter 108 is located a distance of 1 mile from NRS 112. The expected time delay (i.e., TD1) between when RF transmitter 108 transmits RF signal 124 and when NRS 112 receives RF signal 124 is 5280 nanoseconds. In this example, if second base station 106 is 2 miles away from RF transmitter 108, time delay TD2 will be 10560 nanoseconds. TD3 is then measured. In this example, TD3 is measured as 1000 nanoseconds (measured from time T0 to a rising edge T3 of reference clock signal 118). Given the time T0, T2, and the time delay TD3, a clock offset value can be calculated to synchronize the local clock signal at the second base station with reference clock signal 118. For example, given the above calculations, second base station 106 now knows when T3 occurs and may use time T2 as a reference to adjust local clock 116 to match reference clock signal 118

Another approach to provide synchronization between base stations is for each base station to utilize a highly accurate oscillator, such as an Oven Controlled Crystal Oscillator (OCXO). The OCXO can be set when the base station is first powered on and then can run free without any feedback as its drift is small enough over time and through temperature changes so as to stay synchronized. However, OCXOs are much more expensive than standard crystal oscillators.

Still, another approach to synchronize a base station is to use a Temperature Compensated Voltage Controlled Crystal Oscillator (TCVCXO) with feedback provided using an IP network and the IEEE1588 standard. However, this approach requires a network delay that is consistent and guaranteed, such as with an ISDN (e.g., T1), a point to point microwave, or a fiber Optic (e.g., OC3) connection.

Yet another approach for synchronization is for the base stations to utilize Global Positioning System (GPS) signals to synchronize their local clocks. Each base station may include a GPS receiver to receive positioning information via a satellite. Such base stations may use the very accurate GPS clock signal that is transmitted by the satellite along with the positioning information to synchronize the base station's local clock with a master reference clock provided by the communications network. Thus, all base stations in the communications network could synchronize their local clocks with the system-wide master reference clock by utilizing the GPS signal. In this way each base station's clock is adjusted to the master reference clock so as to precisely align timeslot information with all the other cells. With their local clocks synchronized, base stations may be able to provide seamless handoffs of mobile devices from one base station to another.

However, the OCXO, TCVCXO, and GPS approaches for synchronizing a base station with a communications network may not always be feasible with a home base station. For example, as stated above, OCXOs may be too expensive to implement into a home base station. Also, a home or office that utilizes a broadband connection may include network delays that are neither consistent nor guaranteed (e.g., cable or DSL). Also, GPS signals received inside of a building may not be strong enough or coherent enough to be used by the home base station to synchronize itself with other base stations of the wireless communications network. As a result of these limitations of the OCXO, TCVCXO, and GPS approaches, a handoff of a mobile device between an existing base station and a home base station may fail or be significantly delayed and may, for example, result in the dropping of an active call.

The processes explained above are described in terms of computer software and hardware. The techniques described may constitute machine-executable instructions embodied within a machine (e.g., computer) readable medium, that when executed by a machine will cause the machine to perform the operations described. Additionally, the processes may be embodied within hardware, such as an application specific integrated circuit ("ASIC") or the like.

A machine-accessible medium includes any mechanism that provides (i.e., stores and/or transmits) information in a form accessible by a machine (e.g., a computer, network device, personal digital assistant, manufacturing tool, any device with a set of one or more processors, etc.). For example, a machine-accessible medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A server, comprising:
a radio receiver coupled to receive a radio frequency (RF) signal at a time T1;
a clock interface to receive a reference clock signal;
a network interface to couple the server to a base station via a computer network, the network interface configured to receive a time T2 from the base station, the time T2 representative of a time that the RF signal was received at the base station; and
a processing device coupled to the radio receiver, the clock interface and the network interface, wherein the processing device is configured to use the time T1 to determine a time T0 when the RF signal was transmitted and a location of the base station, and wherein the processing device is configured to calculate a clock offset value based on when the RF signal was transmitted, the location of the base station, the time T2, and a reference clock signal, the clock offset value representative of a time to delay a local clock signal at the base station to synchronize the local clock signal at the base station with the reference clock signal.

2. The server of claim 1, wherein the network interface is configured to transmit the calculated clock offset value to the base station.

3. The server of claim 1, wherein the processing device is further configured to calculate a time T0 in response to a time T1 at which the RF signal was received by the radio receiver, wherein time T0 represents a time when the RF signal was transmitted by an RF transmitter.

4. The server of claim 1, wherein the RF signal is one of a plurality of RF signals and the radio receiver is coupled to receive the plurality of RF signals, wherein the processing device is further configured to calculate a distance between the server and an RF transmitter in response to the received plurality of RF signals, wherein the RF transmitter transmitted at least one of the plurality of RF signals.

5. The server of claim 1, wherein the network interface is configured to receive data from the base station via the computer network, the data representative of a plurality of RF signals received at the base station, wherein the processing device is further configured to calculate the location of the base station in response to the received data.

6. The server of claim 1, wherein the RF signal comprises a broadcast television signal that includes periodic timestamp information.

7. The server of claim 1, wherein the clock interface receives the reference clock signal from a master reference clock via a fiber optic link.

8. The server of claim 1, wherein the clock interface receives the reference clock signal from a master reference clock via an ISDN link.

9. A method, comprising:
receiving, by a radio receiver of a server at a time T1, a radio frequency (RF) signal;
receiving, by a clock interface of the server, a reference clock signal; and
receiving, by a network interface of the server, a time T2 from a base station coupled to the server via a computer network, the time T2 representative of a time that the RF signal was received at the base station;
calculating, by a processing device of the server, a location of the base station in response to the time T2; and
calculating, by the processing device of the server, a clock offset value in response to the received RF signal, the RF signal received at the base station, and the reference clock signal, wherein calculating the clock offset value comprises using the time T1 to calculate a time T0 when the RF signal was transmitted by an RF transmitter, and wherein the clock offset value is based on the time T0, the location of the base station, the time T2, and the reference clock signal, the clock offset value used to synchronize a local clock signal at the base station with the reference clock signal.

10. The method of claim 9, further comprising:
transmitting, by the network interface of the server, the calculated clock offset value to the base station.

11. The method of claim 9, wherein receiving the RF signal comprises receiving a first plurality of RF signals, the method further comprising:
calculating a location of the server in response to the received plurality of RF signals.

12. The method of claim 9, wherein calculating the clock offset value further comprises:
determining a time T1 when the RF signal was received at the server;
calculating the time T0 in response to the time T1 and in response to a distance between the RF transmitter and the server; and calculating the clock offset value in response to time T2 and a delay between time T0 and the reference clock signal.

13. The method of claim 9, wherein the RF signal comprises a broadcast television signal.

14. The method of claim 9, wherein the clock interface receives the reference clock signal from a master reference clock.

* * * * *